INVENTOR.
Karl Allan Anderson
BY
Attorney

Jan. 8, 1963 K. A. ANDERSON 3,072,462
MIXING APPARATUS
Filed Sept. 17, 1959 4 Sheets-Sheet 2
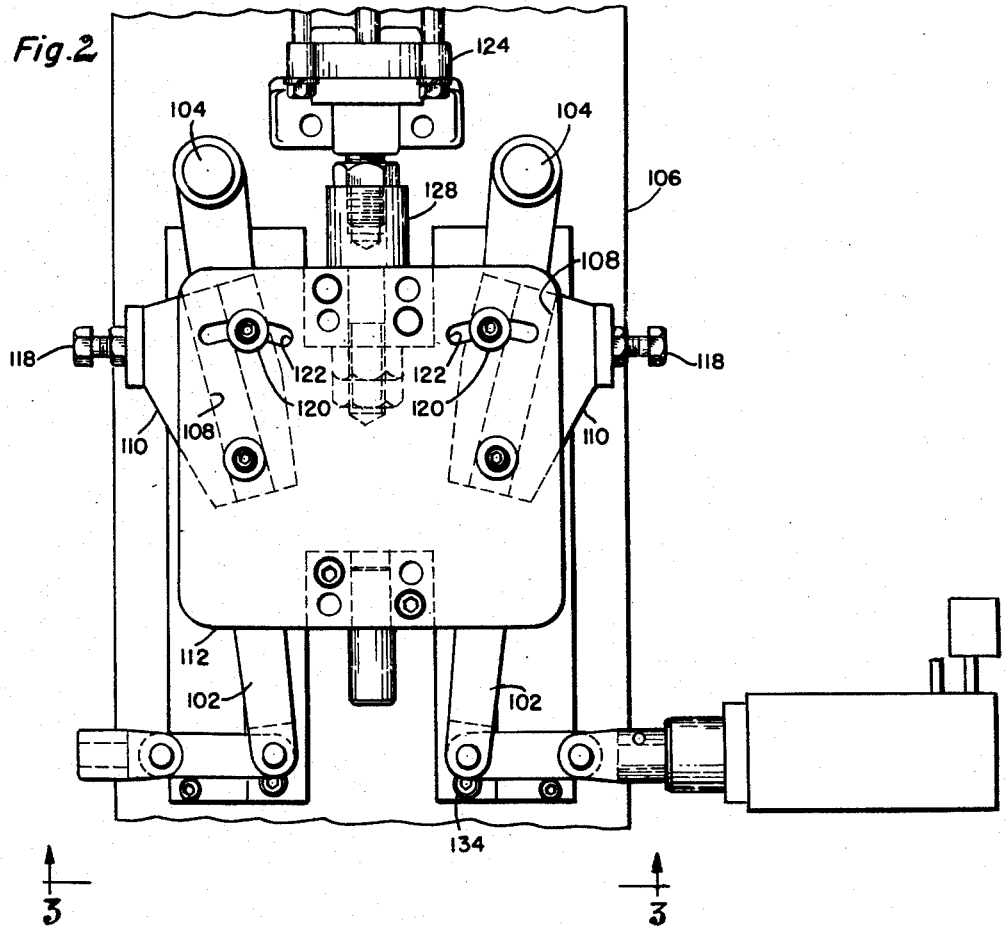
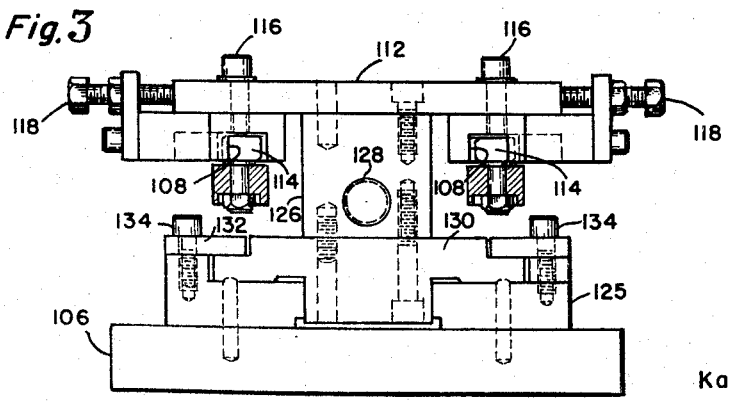
INVENTOR.
Karl Allan Anderson
Attorney Jan. 8, 1963  K. A. ANDERSON  3,072,462
MIXING APPARATUS
Filed Sept. 17, 1959  4 Sheets-Sheet 3
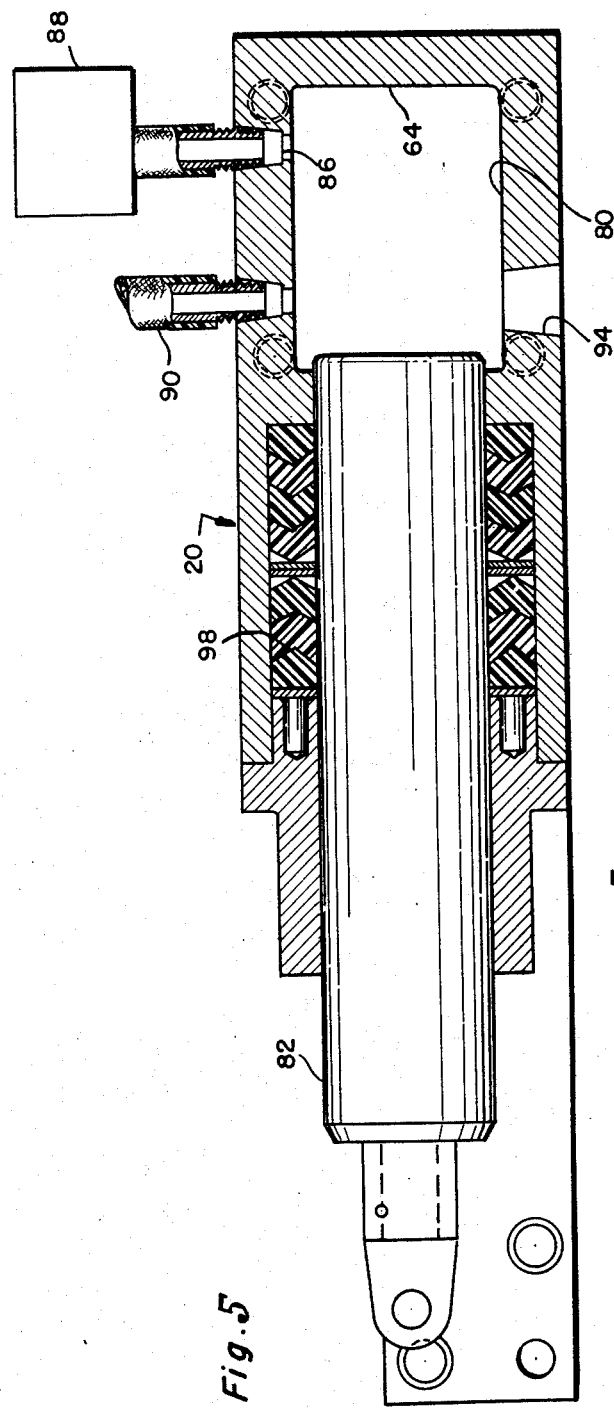
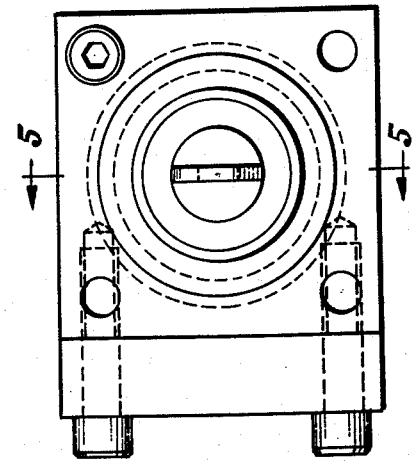
INVENTOR.
Karl Allan Anderson
BY
Attorney

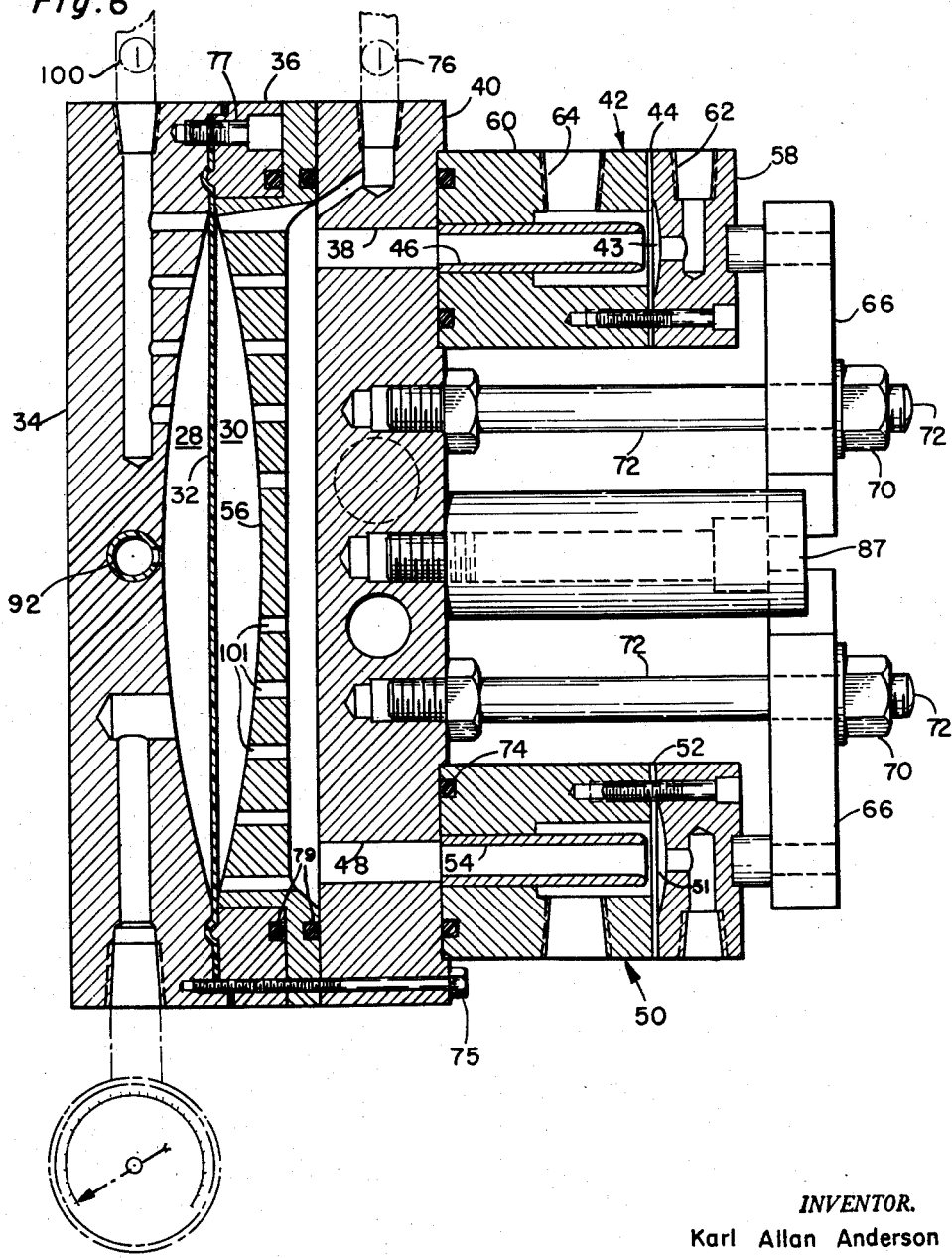

United States Patent Office 3,072,462
Patented Jan. 8, 1963

3,072,462
MIXING APPARATUS
Karl Allan Anderson, Park Ridge, Ill., assignor to Controls Company of America, Schiller Park, Ill., a corporation of Delaware
Filed Sept. 17, 1959, Ser. No. 840,727
3 Claims. (Cl. 23—252)

This invention relates to mixing apparatus and process particularly suited for handling highly abrasive and adhesive materials of a fast setting nature but useable wherever accurate "on stream" mixing is desired.

Compounds containing resin possess chemical and electrical characteristics which are desirable for sealing or encapsulating electrical components. Physically, the resin is an extremely adhesive material, and the addition of fillers to the resin to lower the shrinkage rate and to increase economy introduces an extremely abrasive characteristic to the material which presents problems in handling. By proper selection and proportioning of resin and filler together with proper addition of a catalyst (hardener) the cure time can be brought down to a matter of minutes (assuming the resin, filler and hardener are hot when mixed). This aggravates the problem of handling since we now have an extremely adhesive and abrasive material which must be accurately and completely mixed and poured into the mold quickly so that it will not set in the handling equipment. This necessitates an on-stream type of mixing operation in which the filled resin (hereinafter referred to as resin) and the hardener are intermittently fed simultaneously at a proportioned rate to a mixer which will instantly mix the hardener and resin and purge itself completely of the mixed material so that it will not set within the mixer.

Due to the abrasive nature of the products involved, the most practical pump to be utilized to meter the material is a positive displacement diaphragm pump which must be serviced periodically. The filler, for example, may tend to settle out of the mix within the pump during shut down creating obstructions to the normal flow of material through the pump. Pumps of this type generally require that the seal at the diaphragm be broken to service the interior of the pump. This is undesirable since breaking the seal introduces the possibility of creating leaks in the hydraulic system and further requires that the hydraulic system be drained when only the metering portion of the pump needs to be serviced. It is therefore an object of this invention to provide a diaphragm pump which can be opened for servicing without disturbing the seal at the diaphragm.

In order to insure that the resin and hardener be held a minimum amount of time after mixing, it is desirable to provide on-stream mixing of the materials. The specific mixer employed in the present invention is the subject matter of a separate application Serial Number 841,135, filed September 21, 1959.

Since on-stream mixing is desired, it is necessary to provide a positive system for simultaneously actuating the resin and hardener pumps at proportionate rates to insure that proportionate amounts of resin and hardener are continuously fed to the mixer during the mixing cycle. It is a further object of this invention to provide an apparatus for achieving this simultaneous proportioning motion for the two pumps.

Other objects and advantages will be pointed out in, or be apparent from the specifications and claims as will obvious modifications of the single embodiment shown in the drawings in which:

FIGURE 2 is a front elevation of the proportioning device.

FIGURE 3 is taken on line 3—3 of FIGURE 2 showing the cam arrangement for the proportioning device.

FIGURE 4 is an end view of the pump.

FIGURE 5 is taken on line 5—5 of FIGURE 4 showing a sectional view of the hydraulic pump system.

FIGURE 6 is a vertical section of the diaphragm pump.

Figure 1:
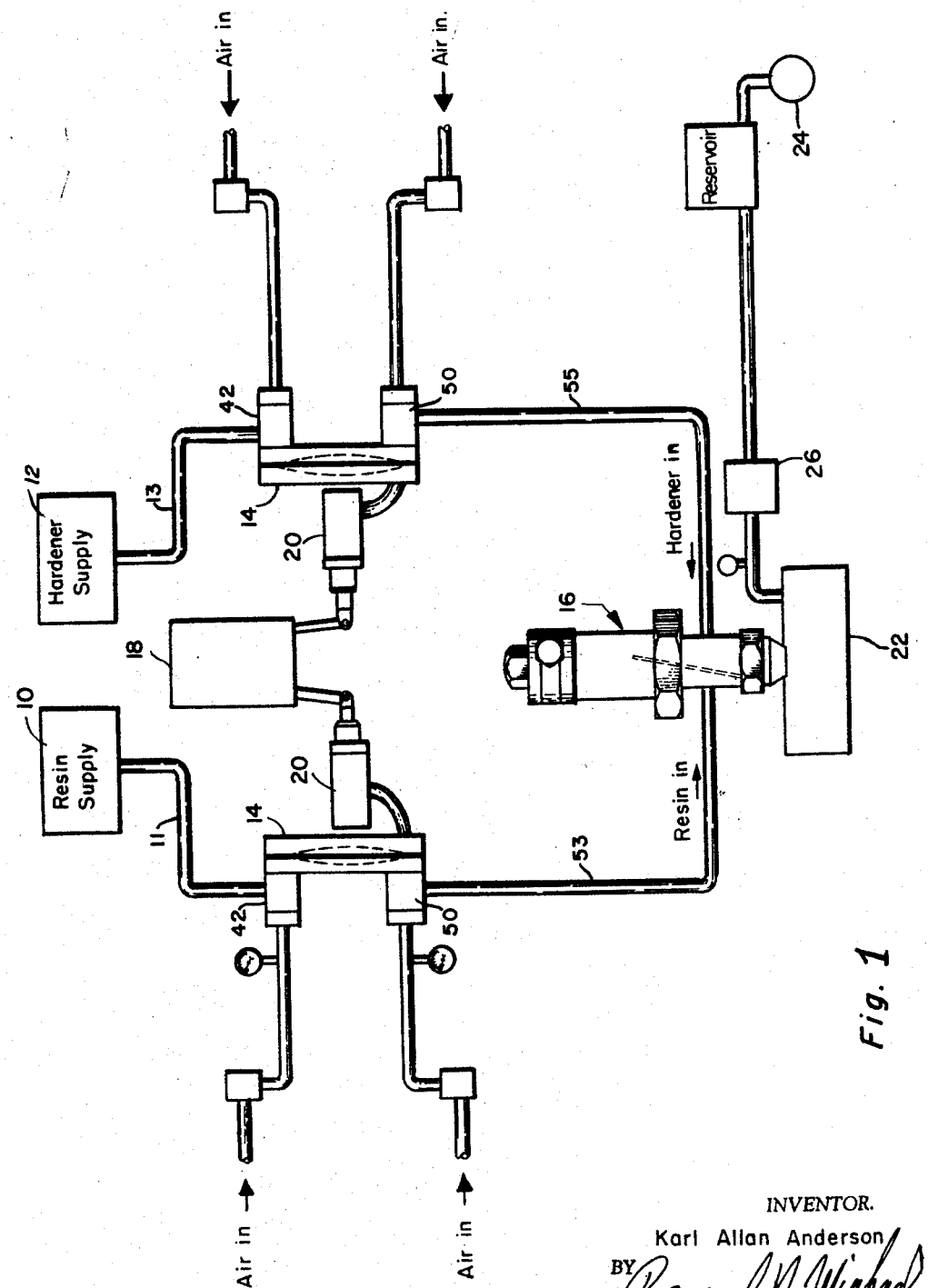
FIGURE 1 is a schematic view of the apparatus used for metering and mixing the resin and hardener.

In the mass production type of operation contemplated herein, the object to be encapsulated is placed in a mold. The metering and dispensing system deliver a measured quantity of the encapsulating material to the mold, which material must contain a proper proportion of the resin and hardener to obtain the desired cure time. Where a very short cure time is desired, it becomes highly important to mix the resin and the hardener immediately before use and only in such quantity as will be used in a single "shot" to the mold. The present mixer is designed to receive a proportional amount of resin and hardener continuously from the metering pumps, mix it on-stream and immediately dispense it to the mold containing the product to be encapsulated.

As seen in FIGURE 1, resin and hardener are supplied from pressurized reservoirs 10 and 12, respectively, to metering pumps 14, 14 which control the volume of resin and hardener supplied to the mixer 16. Pumps 14, 14 are actuated by a proportioning device 18 through hydraulic rams 20, 20 so that a proportional volume of resin and hardener is supplied at uniform rates to the mixer throughout the entire actuating motion of the proportioning device. The mixer outlet communicates with bell 22 which is evacuated during injection by pump 24 through check valve 26.

The resin and hardener are de-aerated and stored in reservoirs 10 and 12. These reservoirs are kept under a constant pressure to insure a ready supply to the metering pumps 14, 14. Because the feed systems for the resin and hardener are identical, the operation of the hardener system only will be explained hereinafter. The metering pump is divided into two chambers 28 and 30 by diaphragm 32 sealed to front plate 34 by diaphragm ring 36. Hardener is admitted to chamber 30 through passage 38 in back plate 40 and controlled by air actuated diaphragm type valve 44 positioned at the inlet to the passage. By increasing the air pressure behind valve 44 to a pressure higher than that of the hardener supply the diaphragm will seat on sleeve 46 so that the flow of hardener to the passage is cut off when chamber 30 has been filled. A similar type valve 52 is used to control the outlet passage 48 from chamber 30. When chamber 30 has been filled, the diaphragm is actuated by increasing the pressure in chamber 28 (to be described hereinafter) and relieving the pressure on the outlet valve so that the diaphragm forces the hardener from chamber 30. The maximum limit of movement of the diaphragm is determined by diaphragm seat 56 secured between the back plate and the diaphragm ring to prevent excessive stretching and possible rupture of the diaphragm. The diaphragm seat is provided with a plurality of orifices 101 to allow the free flow of hardener through the chamber. At the end of the movement of the diaphragm, outlet valve 52 is closed and inlet valve 14 is opened allowing the pressurized hardener to refill the chamber and force the diaphragm back to its original position.

The inlet and outlet valve assemblies 42, 50 are independent units of similar construction. In the inlet assembly an air passage 62 is provided in the cover plate 58 and is connected to chamber 43 behind diaphragm type valve 44. Control of the air pressure in chamber 43 will seat the diaphragm valve on sleeve 46. Resin and hardener are stored in reservoirs 10 and 12 which are connected to inlet passages 64 by flexible tubes 11 and 13, respectively. The resin and hardener are forced under pressure past valve 44 through sleeve 46 and passage 38 into chamber 30 when the air pressure behind valve 44 is less than the pressure of the resin or hardener. Outlet valve assemblies 50 are similar to the inlet valve assembly, having diaphragm type valves 52 that are movable by air pressure into engagement with sleeves 54 and are connected to mixer 16 by flexible connections 53, 55. The valve assemblies are mounted on the back plate of the pump and held thereon by bars 66 fulcrumed on post 68 and are forced against the valve assemblies by nuts 70 on studs 72. The valve assemblies are held in place by the bars 66 and sealed by O ring seals 74. The back plate is secured to the front plate by bolts 75 angularly spaced about the outer periphery of the face of the back plate and passing through the diaphragm seat and the diaphragm ring. The diaphragm ring is secured separately to the front plate by screws 27 alternately spaced with respect to bolts 75. O ring seals 79 are provided between the diaphragm ring and seat and between the diaphragm seat and the back plate to seal the metering chamber. With this arrangement the back plate and diaphragm seat can be removed from the pump without breaking the seal of the diaphragm, in effect making the hydraulic system independent, and without disturbing the seal on the flexible connection. The back plate and seat can then be cleaned and if necessary the inlet and outlet valves removed by releasing bars 66 from studs 72.

The metering pump is actuated by hydraulic system 20 which includes cylinder 80 and piston 82 axially moveable therein. The cylinder has a diameter greater than the diameter of the piston. Hydraulic fluid flows into the cylinder through inlet valve 86 from supply reservoir 88. Air is bled through air bleed valve 90. The cylinder is connected to inlet passage 92 in the front plate of the pump through outlet 94 and passage 96. The piston is moveable through Teflon rings 98 which seal the piston within the cylinder and prevent fluid leakage around the piston so that the full hydraulic force created within the reservoir on movement of the piston is exerted on the diaphragm in the pump. When filling the cylinder in the ram with hydraulic fluid, the fluid is allowed to flow into chamber 28 in the metering pump and air is bled therefrom through air bleed valve 76. It is important to the operation of the system that all the air be bled from the cylinder and chamber 28 when filled so that the hydraulic system is incompressible.

The hydraulic rams for the metering pumps are controlled simultaneously by the motion of a pair of levers 102 connected at their lower ends to the pistons of the rams and pivoted at their upper ends in pins 104 projecting from stationary plate 106. The levers are moved back and forth by the action of cam followers 114 slideably engaging grooves 108 provided in cam plates 110. The cam plates are secured to front plate 112 which is moved vertically up and down by a double acting air cylinder 124. The cam plates are pivoted on pins 116 so that the angle of the groove with respect to the lever can be varied by adjusting screws 118 and set by screws 120 in slots 122. The front plate is connected to crosshead 130 by spacer 126 which is vertically moveable between guides 125 and held thereon by retainers 132 and to the air cylinder by rod 128 connected to spacer 126. The front plate is moved downward by pressurizing the air cylinder thereby moving the levers outward against the piston in the hydraulic ram. The downward movement of the front plate and cam surfaces is limited by the air cylinder so that the angle of the cam plate determines the outward speed and distance of travel for the levers.

When the metering pumps are actuated, air pressure on the outlet valves is relieved and the diaphragms force the resin and hardener simultaneously out of the pumps to the mixer. The amount of resin and hardener metered to the mixer depends on the speed and stroke of the pistons in the hydraulic rams. The maximum movement of the diaphragms is limited by the diaphragm seat to prevent rupturing the diaphragm. At the end of the piston pumping stroke, the air outlet valves are closed and the air inlet valves opened allowing the pressurized resin and hardener to flow into the pumps. The air cylinder is pressurized as the outlet valve is opened to slowly move the front plate upward returning the levers to their initial position so that the diaphragms are moved back to their normal position by the pressure of the resin and hardener. By having the resin and hardener move the diaphragm back to its normal position, rather than the diaphragm being pulled back by the hydraulic fluid and creating a vacuum within the pumps, the possibility of air leaking into the pumps is eliminated.

In filling the device the resin and hardener supply chambers are kept under a constant pressure by any suitable means. The metering pumps are filled by relieving the pressure on the air inlet valves and outlet valves and opening the air bleed valves. The resin and hardener will fill one side of the metering pumps and when filled the outlet valve, air bleed valve and inlet valve are closed. The hydraulic system is filled by opening the air bleed valves 90 and 100 and allowing hydraulic fluid to flow into the cylinder from reservoir 88. Air bleed valve 100 is closed when chamber 28 is filled and valve 90 when the cylinder is filled. In operation air cylinder 124 is pressurized actuating lever system 18. Levers 102 will bear against the pistons in the hydraulic rams pressurizing the hydraulic fluid therein. Simultaneous with the pressurizing of the air cylinder, air outlet valves 19 will be opened. The hydraulic pressure of the fluid on the diaphragms, being dependent on the speed and stroke of the piston, will force a metered amount of resin and hardener out of the pump forcing a like amount into the mixer. At the end of the air cylinder pumping stroke, the air outlet valve will be closed and the air inlet valve will be opened allowing the pressurized resin and hardener to act against the diaphragms. The pressure in the air cylinder will be reversed simultaneously with the opening of the inlet valve moving the levers back slowly so that the diaphragm will be moved to its normal position by the pressure of the resin and hardener.

Although but one embodiment of the present invention has been illustrated and described, it will be apparent to those skilled in the art that various changes and modifications may be made therein without departing from the spirit of the invention or from the scope of the appended claims.

I claim:

1. Fluid metering apparatus comprising a pair of metering pumps each including a cavity having a diaphragm mounted therein and dividing the cavity into two chambers, means for removably mounting the diaphragms within the respective pumps, removable pump structures in each pump providing an inlet to and an outlet from a chamber on one side of the respective diaphragms thereof, means for securing said removable pump structures in place on the respective pumps in overlying relation to said diaphragm mounting means but independently thereof whereby said removable pump structures may be removed from the pumps without disturbing the diaphragm and its mounting means, mixing means connected to receive the discharge from both of said pumps, hydraulic actuating means for the pumps including a pair of pistons movable in cylinders connected respectively to the other of said chambers to force liquid from the cylinders into said other chambers respectively, means for supplying liquid to said cylinders, and means for simultaneously operating said pistons including motion transmission means connected to said pistons and having adjustment means for proportioning the relative lengths of stroke of the pistons within said cylinders thereby to force predetermined quantities of liquid from said cylinders into said other chambers of the pumps respectively, and thus displace the respective pump diaphragms a predetermined amount to actuate the pump diaphragms to pump metered quantities of liquids from sources respectively connected thereto and deliver the same to said mixing means within a predetermined period of time.

2. An apparatus for providing metered quantities of resin and hardener to a mixer comprising, a source of supply of resin, a source of supply of hardener, a pair of diaphragm pumps, each including a diaphragm and means for mounting the diaphragm within the pump, pump structures in each pump defining with said diaphragms a chamber on each side of said diaphragms, means connecting one of said chambers of each of said pumps to said sources of supply respectively, the pump structures of each pump which define the chamber thereof to which said supplies are connected being removably secured to the respective pumps independently of said diaphragm mounting means, mixing means connected to receive the discharge from both of said pumps, hydraulic means including a pair of piston type hydraulic rams connected respectively to the other of said pump chambers for actuating the respective pump diaphragms, motion transmission means interposed between a source of power and said rams and including adjustable mechanical means for controlling the relative length of stroke of said ram pistons thereby to displace in predetermined amounts the respective pump diaphragms so that the pumps deliver metered quantities of resin and hardener to said mixing means, said adjustable means including a pair of pivoted levers having their free ends connected to the pistons of the respective rams, and a pair of cams mounted for linear reciprocal motion and operatively connected to oscillate the levers in both directions of motion, said cams being adjustable to vary the length of stroke of the pistons of the respective hydraulic rams.

3. An apparatus for providing metered quantities of resin and hardener to a mixer comprising, a pair of diaphragm pumps each including means providing a cavity, and a diaphragm mounted in the cavity and providing on opposite sides of the diaphragm a hydraulic section and a pumping section, removable pump structures providing an inlet to and an outlet from the pumping section of each pump and means for mounting said removable pump structures on the respective pumps independently of mounting means for said diaphragms, means for supplying different fluids to the pumping section of each pump, means for supplying hydraulic actuating fluid for the hydraulic sections of the respective pumps, mixing means and means for supplying metered quantities of resin and hardener from said pumps to said mixing means, said last-mentioned means including a pair of piston type hydraulic rams connected to the respective hydraulic sections of said pumps for actuating the pump diaphragms, a lever system for actuating the pistons of said rams, said system including a pair of pivoted levers lying in a common plane and each having one end connected to a ram piston, a cam follower carried by each lever, a plate movable in a plane parallel to the plane of the levers, and a pair of cam plates connected to the movable plate and each including a cam groove for engaging the cam followers respectively so that movement of the plate will cause the levers to impart predetermined relative motion to the ram pistons, and means for actuating the lever system.

References Cited in the file of this patent

UNITED STATES PATENTS

| | | |
|---|---|---|
| 2,802,648 | Christensen et al. | Aug. 13, 1957 |
| 2,894,732 | Taber et al. | July 14, 1959 |
| 2,895,644 | Pande | July 21, 1959 |